(12) United States Patent
Lovati

(10) Patent No.: US 12,031,638 B2
(45) Date of Patent: Jul. 9, 2024

(54) HVAC ACTUATOR

(71) Applicant: Johnson Controls Tyco IP Holdings LLP, Milwaukee, WI (US)

(72) Inventor: Mattia Lovati, Milan (IT)

(73) Assignee: Tyco Fire & Security GmbH, Neuhausen am Rheinfall (CH)

(*) Notice: Subject to any disclaimer, the term of this patent is extended or adjusted under 35 U.S.C. 154(b) by 278 days.

(21) Appl. No.: 17/372,214

(22) Filed: Jul. 9, 2021

(65) Prior Publication Data

US 2022/0010888 A1   Jan. 13, 2022

Related U.S. Application Data

(60) Provisional application No. 63/050,569, filed on Jul. 10, 2020.

(51) Int. Cl.
  *F16K 31/04* (2006.01)
  *F16K 31/54* (2006.01)

(52) U.S. Cl.
  CPC ............ *F16K 31/047* (2013.01); *F16K 31/54* (2013.01)

(58) Field of Classification Search
  CPC ................................ F16K 31/047; F16K 31/54
  See application file for complete search history.

(56) References Cited

U.S. PATENT DOCUMENTS

| | | | | |
|---|---|---|---|---|
| 4,760,989 A | * | 8/1988 | Elliott | ............ F16K 31/05 74/25 |
| 11,118,658 B1 | * | 9/2021 | Johnson | ............ F16H 3/66 |

* cited by examiner

*Primary Examiner* — Eric Keasel
(74) *Attorney, Agent, or Firm* — Foley & Lardner LLP

(57) ABSTRACT

A heating, ventilation, or air conditioning (HVAC) actuator is shown. The actuator includes a motor and an epicyclic gear train assembly, including a sun gear, an annulus, and a plurality of planet gears. The epicyclic gear train assembly is configured to receive, at at least one of the sun gear or the annulus, an input motion at a first rotational velocity from the motor. The epicyclic gear train assembly is further configured to provide an output motion at a second rotational velocity to an HVAC component, the second rotational velocity different than the first rotational velocity.

20 Claims, 7 Drawing Sheets

HVAC ACTUATOR

CROSS-REFERENCE TO RELATED APPLICATION

This application claims priority from U.S. Provisional Patent Application No. 63/050,569, filed Jul. 10, 2020, which is incorporated by reference herein in its entirety.

BACKGROUND

The present disclosure relates to heating, ventilation, and/or air-conditioning (HVAC) actuators for driving one or more HVAC devices.

In some instances, HVAC systems are important to survive in environments with unsuitable atmospheric conditions, such as high or low temperatures, presence of pollutants, pathogens, high or low humidity, high or low air flow.

HVAC systems include HVAC devices or components such as air inlets, filters, dampers, fans, humidifiers, heating and/or cooling coils, air outlets, ducts, electrical elements, outdoor units, compressors, and blowers. Some of these components are driven by actuators. In an example, an actuator may be configured to control the movement of a damper within a duct. Actuators often include a motor, solenoid, or other device that moves at a speed and/or torque which can be controlled by varying pulse width, frequency and/or voltage of a signal supplied to the motor, solenoid, or other device. The speed and torque can be controlled up to a limit. Some actuators includes a gear train to generate an output motion with a required speed and torque for driving a component which is beyond the speed or torque limit.

In a conventional HVAC actuator, a parallel axis gear unit having transmission ratio of 4:1 per stage is often used to convert input power to a required output power. Due to the limited transmission ratio of 4:1, more stages of gear systems are required to achieve a wider scale of movement. The requirement of more stages can require complex gear arrangements which in turn make the parallel axis gear unit expensive. The available power for transmission in the conventional actuators is not utilized properly, i.e., the power is not transferred to a wider range per stage. There exists a need to provide an HVAC actuator that alleviates the drawbacks of conventional HVAC actuators.

SUMMARY

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

One implementation of the present disclosure is a heating, ventilation, or air conditioning (HVAC) actuator. The actuator includes a motor and an epicyclic gear train assembly, including a sun gear, an annulus, and a plurality of planet gears. The epicyclic gear train assembly is configured to receive, at at least one of the sun gear or the annulus, an input motion at a first rotational velocity from the motor. The epicyclic gear train assembly is further configured to provide an output motion at a second rotational velocity to an HVAC component, the second rotational velocity different than the first rotational velocity.

In some embodiments, the epicyclic gear train assembly includes a plurality of epicyclic gear trains in series, such that a first output motion of a first epicyclic gear train of the epicyclic gear train assembly is the input motion to a second epicyclic gear train in the epicyclic gear train assembly.

In some embodiments, the HVAC actuator is a linear actuator and the epicyclic gear train assembly is configured to provide the output motion to a linear motion converter, the linear motion converter including at least one of a leadscrew, a screw, a ball screw, a roller screw, a rack and pinion arrangement, a chain drive or a belt drive. In some embodiments, the liner motion converter converts the received output motion to a linear motion and provides the linear motion to a valve stem of a valve assembly.

In some embodiments, the HVAC actuator is a rotary actuator and the epicyclic gear train assembly is configured to provide the output motion to a valve stem of a valve assembly.

In some embodiments, the epicyclic gear train assembly includes a transmission ration within a range of 11:1 to 25:1.

In some embodiments, the input motion is received at the sun gear and the second rotational velocity is a first value or the input motion is received at the annulus and the second rotational velocity is a second value. In some embodiments, the second value is substantially greater than the first value.

In some embodiments, the HVAC actuator further includes a controller coupled to the motor and including a processing circuit configured to receive at least one of position, velocity, or acceleration data relating to operation of the epicyclic gear train assembly and provide a control signal to the motor, the control signal instructing the motor to adjust the input motion based on the at least one of the position, velocity, or acceleration data. In some embodiments, the controller, the motor, and the epicyclic gear train assembly are disposed within a single housing.

Another implementation of the present disclosure is a heating, ventilation, or air conditioning (HVAC) system for controlling an HVAC actuator. The system includes a motor and an epicyclic gear train assembly including a sun gear, an annulus, and a plurality of planet gears, the epicyclic gear train assembly configured to receive, at at least one of the sun gear or the annulus, an input motion at a first rotational velocity from the motor and provide an output motion at a second rotational velocity to an HVAC component, the second rotational velocity different than the first rotational velocity. The HVAC system further includes one or more sensors configured to obtain measurements of the input motion and the output motion. The HVAC system further includes a controller including a processing circuit configured to adjust the input motion based on the obtained measurements from the one or more sensors.

In some embodiments, the epicyclic gear train assembly includes a plurality of epicyclic gear trains in series, such that a first output motion of a first epicyclic gear train of the epicyclic gear train assembly is the input motion to a second epicyclic gear train in the epicyclic gear train assembly.

In some embodiments, the HVAC actuator is a linear actuator and the epicyclic gear train assembly is configured to provide the output motion to a linear motion converter, the linear motion converter including at least one of a leadscrew, a screw, a ball screw, a roller screw, a rack and pinion arrangement, a chain drive or a belt drive. In some embodiments, the liner motion converter converts the received output motion to a linear motion and provides the linear motion to a valve stem of a valve assembly.

In some embodiments, the HVAC actuator is a rotary actuator and the epicyclic gear train assembly is configured to provide the output motion to a valve stem of a valve assembly.

In some embodiments, the epicyclic gear train assembly includes a transmission ration within a range of 11:1 to 25:1.

In some embodiments, the input motion is received at the sun gear and the second rotational velocity is a first value or the input motion is received at the annulus and the second rotational velocity is a second value. In some embodiments, the second value is substantially greater than the first value.

In some embodiments, the processing circuit is further configured to receive at least one of position, velocity, or acceleration data relating to operation of the epicyclic gear train assembly and provide a control signal to the motor, the control signal instructing the motor to adjust the input motion based on the at least one of the position, velocity, or acceleration data. In some embodiments, the controller, the motor, and the epicyclic gear train assembly are disposed within a single housing.

Another implementation of the present disclosure is a flow control system, the flow control system including a motor and an epicyclic gear train assembly including a sun gear, an annulus, and a plurality of planet gears. The epicyclic gear train assembly configured to receive, at at least one of the sun gear or the annulus, an input motion at a first rotational velocity from the motor and provide an output motion at a second rotational velocity to a valve stem of a valve assembly, the second rotational velocity different than the first rotational velocity. The flow system further includes the valve assembly disposed within a fluid stream and configured to modulate fluid flow in the fluid stream based on the output motion.

In some embodiments, the epicyclic gear train assembly includes a plurality of epicyclic gear trains in series, such that a first output motion of a first epicyclic gear train of the epicyclic gear train assembly is the input motion to a second epicyclic gear train in the epicyclic gear train assembly.

In some embodiments, the HVAC actuator is a linear actuator and the epicyclic gear train assembly is configured to provide the output motion to a linear motion converter, the linear motion converter including at least one of a leadscrew, a screw, a ball screw, a roller screw, a rack and pinion arrangement, a chain drive or a belt drive. In some embodiments, the liner motion converter converts the received output motion to a linear motion and provides the linear motion to the valve stem of the valve assembly.

In some embodiments, the epicyclic gear train assembly includes a transmission ration within a range of 11:1 to 25:1.

In some embodiments, the input motion is received at the sun gear and the second rotational velocity is a first value or the input motion is received at the annulus and the second rotational velocity is a second value. In some embodiments, the second value is substantially greater than the first value.

In some embodiments, the flow control system further includes a controller coupled to the motor and including a processing circuit configured to receive at least one of position, velocity, or acceleration data relating to operation of the epicyclic gear train assembly and provide a control signal to the motor, the control signal instructing the motor to adjust the input motion based on the at least one of the position, velocity, or acceleration data. In some embodiments, the controller, the motor, and the epicyclic gear train assembly are disposed within a single housing.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Overview

Referring generally to THE FIGURES, the systems and methods disclosed herein generally refer to embodiments of an HVAC actuator. In some embodiments, the HVAC actuator includes a motor and a gear unit (e.g., an epicyclic gear train unit, etc.) that is enabled to operate with one or more stages (e.g., two stages, etc.). The motor may be configured to provide an input motion via a motor shaft. The input motion from the motor can be received by the gear unit (e.g., the epicyclic gear train unit, planetary system gear unit, etc.). The received input motion can then be converted to an output motion with desired parameters by the gear unit (e.g., the epicyclic gear train unit, etc.). The output motion may then be used to drive an HVAC device. The implementation of the gear unit (e.g., the epicyclic gear train unit) may enable the HVAC actuator to transmit rotational motion and power with high transmission ratios.

Building HVAC System

Figure 1:
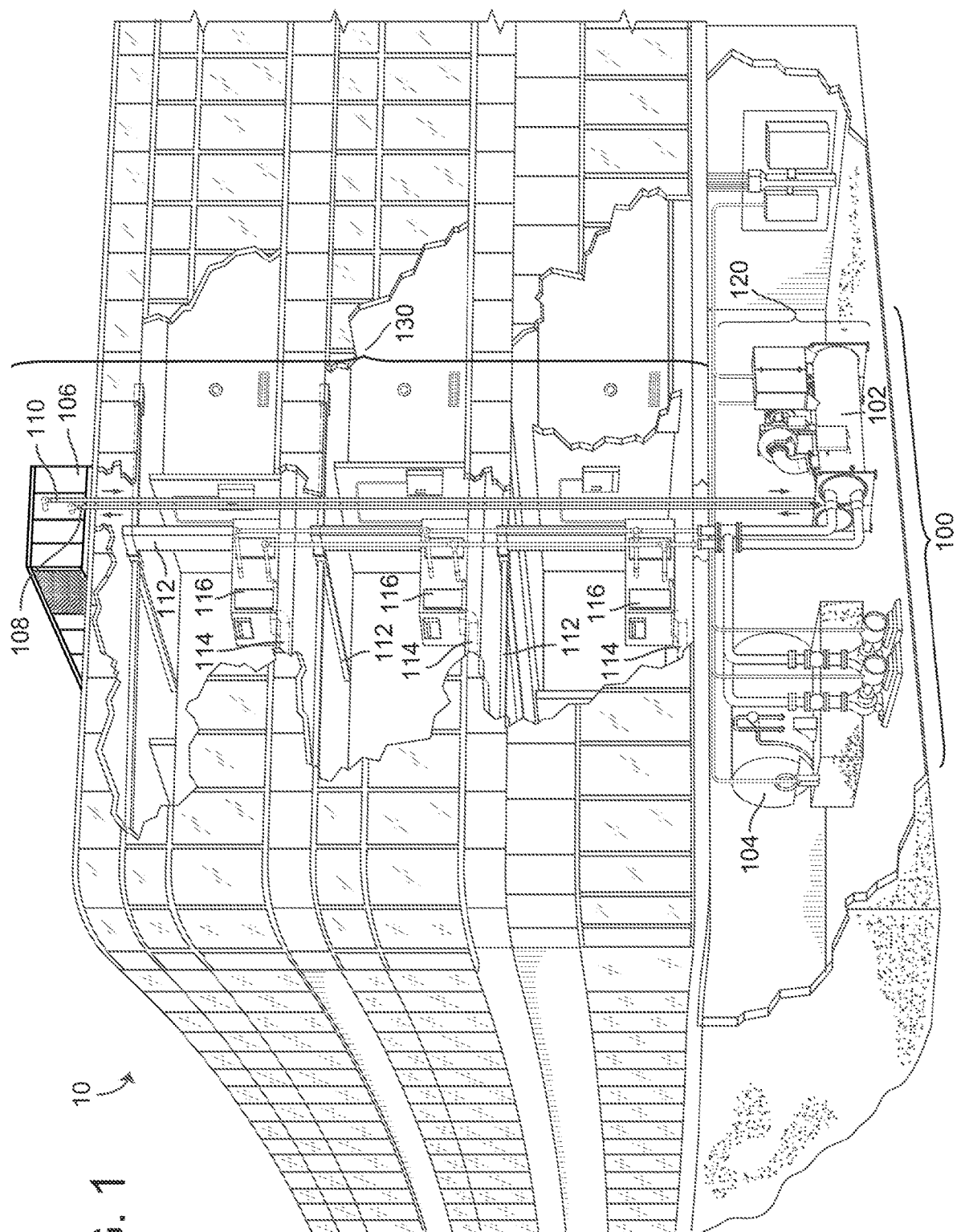
FIG. 1 is a perspective view of a building including a heating, ventilating, or air conditioning (HVAC) system, according to some embodiments.

Referring now to FIG. 1, a perspective view of a building 10 is shown. Building 10 is served by a heating, ventilating, or air conditioning (HVAC) system 100. HVAC system 100 can include a plurality of HVAC devices (e.g., heaters, chillers, air handling units, pumps, fans, thermal energy storage, etc.) configured to provide heating, cooling, air conditioning, ventilation, and/or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10.

HVAC system 100 is shown to include a chiller 102, a boiler 104, and an air handling unit (AHU) or a rooftop air handling unit (RTU) 106. Waterside system 120 may use boiler 104 and chiller 102 to heat or cool a working fluid (e.g., water, glycol, etc.) and may circulate the working fluid to RTU 106. In various embodiments, the HVAC devices of waterside system 120 can be located in or around building 10 (as shown in FIG. 1) or at an offsite location such as a central plant (e.g., a chiller plant, a steam plant, a heat plant, etc.) that serves one or more buildings including building 10. The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU or RTU 106 via piping 108.

RTU 106 may place the working fluid in a heat exchange relationship with an airflow passing through RTU 106 (e.g., via one or more stages of cooling coils and/or heating coils). The airflow can be, for example, outside air, return air from within building 10, or a combination of both. AHU or RTU 106 may transfer heat between the airflow and the working fluid to provide heating or cooling for the airflow. For example, RTU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by RTU 106 (i.e., the supply airflow) to building 10 via air supply ducts 112 and may provide return air from building 10 to RTU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. RTU 106 can include various sensors (e.g., temperature sensors, pressure sensors, etc.) configured to measure attributes of the supply airflow. RTU 106 may receive input from sensors located within AHU or RTU 106 and/or within the building zone and may adjust the flow rate, temperature, or other attributes of the supply airflow through RTU 106 to achieve set point conditions for the building zone.

A Conventional HVAC Actuator

Figure 2:
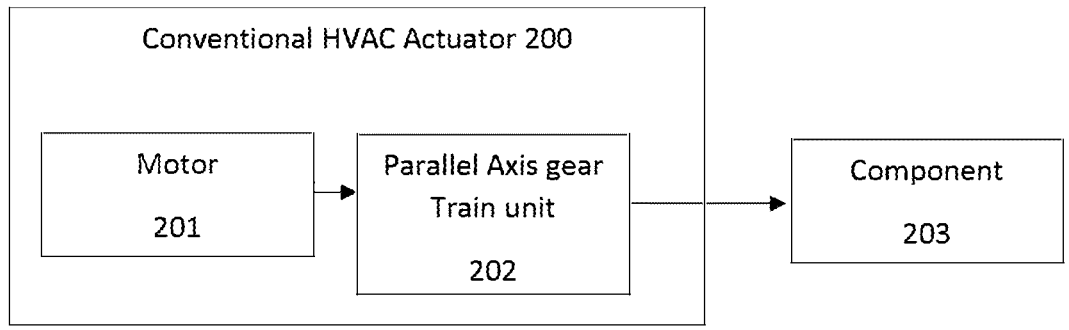
FIG. 2 is a general block diagram of a conventional actuator, which can be implemented in the HVAC system of FIG. 1, according to some embodiments.

Referring now to FIG. 2 that shows a block diagram of a conventional HVAC actuator 200. The conventional HVAC actuator 200 may include a motor 201 and a parallel axis gear train unit 202. The motor 201 provides a rotational motion as an input to the parallel axis gear train unit 202 which converts the rotational motion into a desired output rotational motion for a component 203. The implementation of the parallel axis gear train unit 202 enables the conventional HVAC actuator 200 to provide a rotational motion having a desired speed and a desired torque. The desired speed and torque cannot be generated when the motor 201 is directly coupled to the component 203 except in a case where the torque and speed provided by the motor 201 is equivalent to the desired torque and speed for actuating the component 203.

An HVAC Actuator

Figure 3:
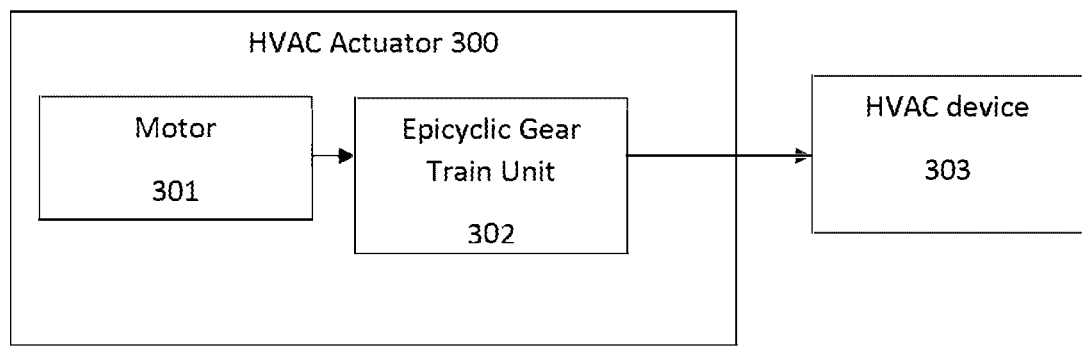
FIG. 3 is a general block diagram of an HVAC actuator, which can be implemented in the HVAC system of FIG. 1, according to some embodiments.

Referring now to FIG. 3, an HVAC actuator 300 is disclosed. The HVAC actuator 300 may include a motor 301 and an epicyclic gear train unit 302. The HVAC actuator 300 can be used to provide motion for HVAC equipment, devices, components and systems such as the HVAC devices in the HVAC system 100 discussed above with reference to FIG. 1.

In some embodiments, the motor 301 is configured to provide an input motion to the epicyclic gear train unit 302. In some embodiments, the motor 301 is a solenoid or other device for providing mechanical motion in response to electric energy. The motor 301 is mechanically coupled to the epicyclic gear train unit 302 by a coupling. The coupling can be or include one or more bearings, shafts, collars, chains, belts, pulleys, gears and/or other connecting devices. The input motion may be received by an input shaft (not shown) of the epicyclic gear train unit 302. The epicyclic gear train unit 302 is configured to convert the input motion to an output motion at a speed and torque for operation of an HVAC device 303. The HVAC device 303 may be enabled to receive the output motion via an output shaft of the epicyclic gear train unit 302. The HVAC device 303 may be mechanically coupled to the output shaft of the epicyclic gear train unit 302 via a coupling (e.g., including a bearing, shaft, collar, chain, belt, pulley, gear and/or other connecting device).

In some embodiments, the epicyclic gear train unit 302 includes a planetary gear arrangement having different forms of gears in some embodiments. In some embodiments, the gears may be selected from, but are not limited to, a spur gear, a helical gear, a bevel gear or a worm and worm wheel pair. The planetary gear arrangement may be secured by a cover filled with a lubricating material. The cover may include sealed holes that may be affixed to the input shaft and the output shaft. A bearing may be fixed between the sealed holes and the input and output shafts. There may be additional holes or openings for draining the used or old lubricant and for filling the new lubricant in the epicyclic gear unit.

In an embodiment, the HVAC device 303 is at least one of, but not limited to, a compressor, a blower, a louver, a valve, a damper and may be any device which can be operated by the HVAC actuator 300.

The epicyclic gear train unit 302, i.e. a transmission drive, of the HVAC actuator 300 enables the transmission of rotational motion in lesser number of stages with each stage capable of transmitting the rotational motion and power with a higher ratio as compared to the conventional HVAC actuator 200 having the parallel axis gear train unit 202.

In an embodiment, the transmission ratio of the epicyclic gear train unit 302 may range from 11:1 to 25:1 per stage which is higher than the transmission ratio possible with the use of the parallel axis gear train unit 202 4:1 per stage associated with certain conventional arrangements. This advantage of higher transmission ratio enables the HVAC actuator 300 to transmit wider range of rotational motion per stage. Therefore, when the input motion is to be transferred to the output motion with required parameters such as speed and torque, less stages are required to deliver the output motion by the epicyclic gear train unit 302 as compared with the parallel axis gear train unit 202.

In another embodiment, implementation of the epicyclic gear train unit 302 in the HVAC actuator 300 facilitates high transmission ratio per stage, high rotational speed with less winding losses, stacked topology leading to reduced horizontal footprint, high load distribution and wide range of speed transmission.

In an example, a single stage epicyclic gear train unit may transmit the same rotational motion and power as transmitted by a three-staged parallel axis gear train unit.

Figure 4:
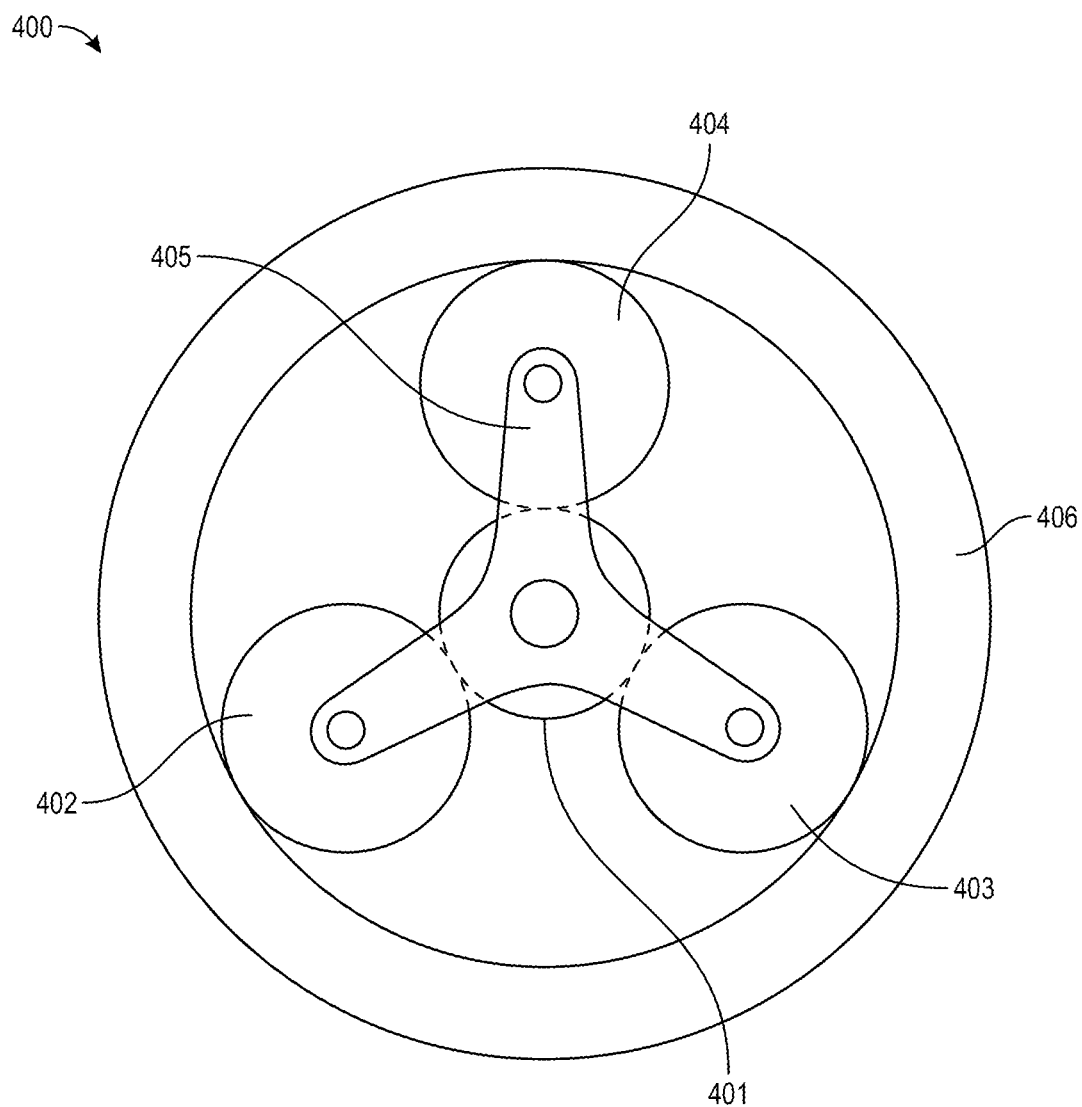
FIG. 4 is a top planar view schematic drawing of an epicyclic gear train unit, which can be implemented in the actuator of FIG. 3, according to some embodiments.

Referring now to FIG. 4, in an embodiment, a gear arrangement of the epicyclic gear train unit 302 is shown. The epicyclic gear train unit 302 is shown to include a sun gear 401, one or more planet gears (402, 403 and 404), a carrier 405 and an annulus 406.

The sun gear 401 may be a spur gear or a helical gear and can be placed at the center of the epicyclic gear train unit 302. An input rotational motion may be provided to the sun gear 401. The input rotational motion may be either received by electrical means comprising an AC motor or a DC motor or by any other suitable means.

The planet gears 402, 403 and 404 surround the sun gear 401 and coordinate by rotating and revolving around the sun gear 401. The planet gears 402, 403 and 404 may receive the rotational motion from the sun gear 401. The engagement of teeth may enable the transfer of rotational motion. In an embodiment, the planet gears 402, 403 and 404 are configured to rotate and revolute around the sun gear 401 simultaneously while in another embodiment, the planet gears 402, 403 and 404 may only rotate for transferring the rotational motion.

The carrier 405 is a single structure which is enabled to engage with the planet gears (402, 403 and 404) at each of the rotational axis of the planet gears 402, 403 and 404. The annulus 406 is a gear which engages and surrounds the planet gears 402, 403 and 404 and is the only internal gear having engaging teeth at the inner side. The annulus 406 may be fixed or freely rotatable. The carrier 405 may further include a main shaft through which the rotational motion from the epicyclic gear train unit is transmitted as an output rotational motion.

In an embodiment, the sun gear 401 may receive the input rotational motion which is further transferred to the planet gears (402, 403 and 404). The transmission of motion depends on the state of the annulus 406 which may be either freely rotatable or fixed. In an embodiment, when the annulus 406 is fixed, the speed of the transferred rotation motion is low. In another embodiment, when the annulus 406 is freely rotatable, the speed of the transferred rotation motion is high.

It may be obvious to one skilled in the art that while FIG. 4 shows an actuator with three (3) planet gears 402, 403, and 404, in other embodiments the epicyclic gear train unit 302 may include one or more planet gears.

Figure 5:
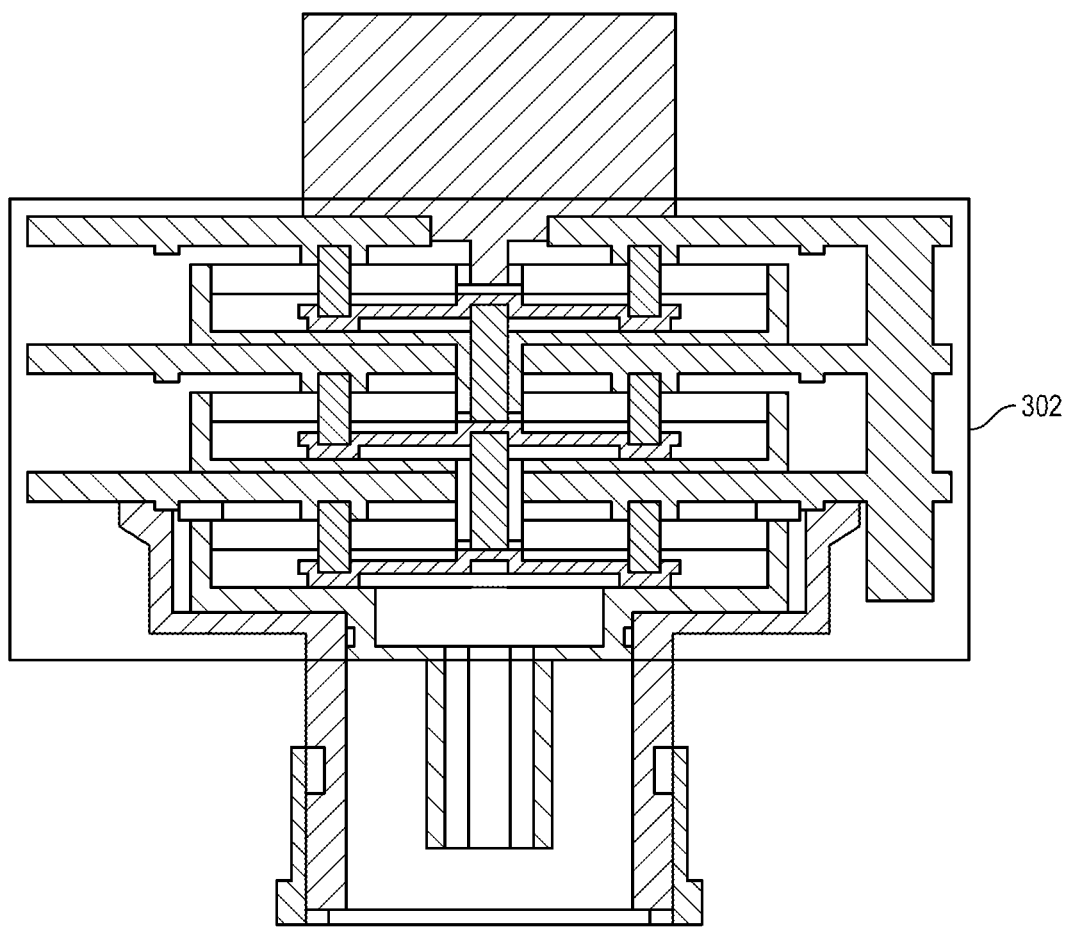
FIG. 5 is a side view, cut away schematic drawing of an epicyclic gear train unit, which can be implemented in the actuator of FIG. 3, according to some embodiments.

Referring now to FIG. 5, the epicyclic gear train unit 302 with three stages is shown. The epicyclic gear train unit 302 with three stages may be implemented when the HVAC actuator 300 is a rotary actuator. For an example, the three stage epicyclic gear train unit 302 includes three planetary stages having a single sun gear.

Figure 6:
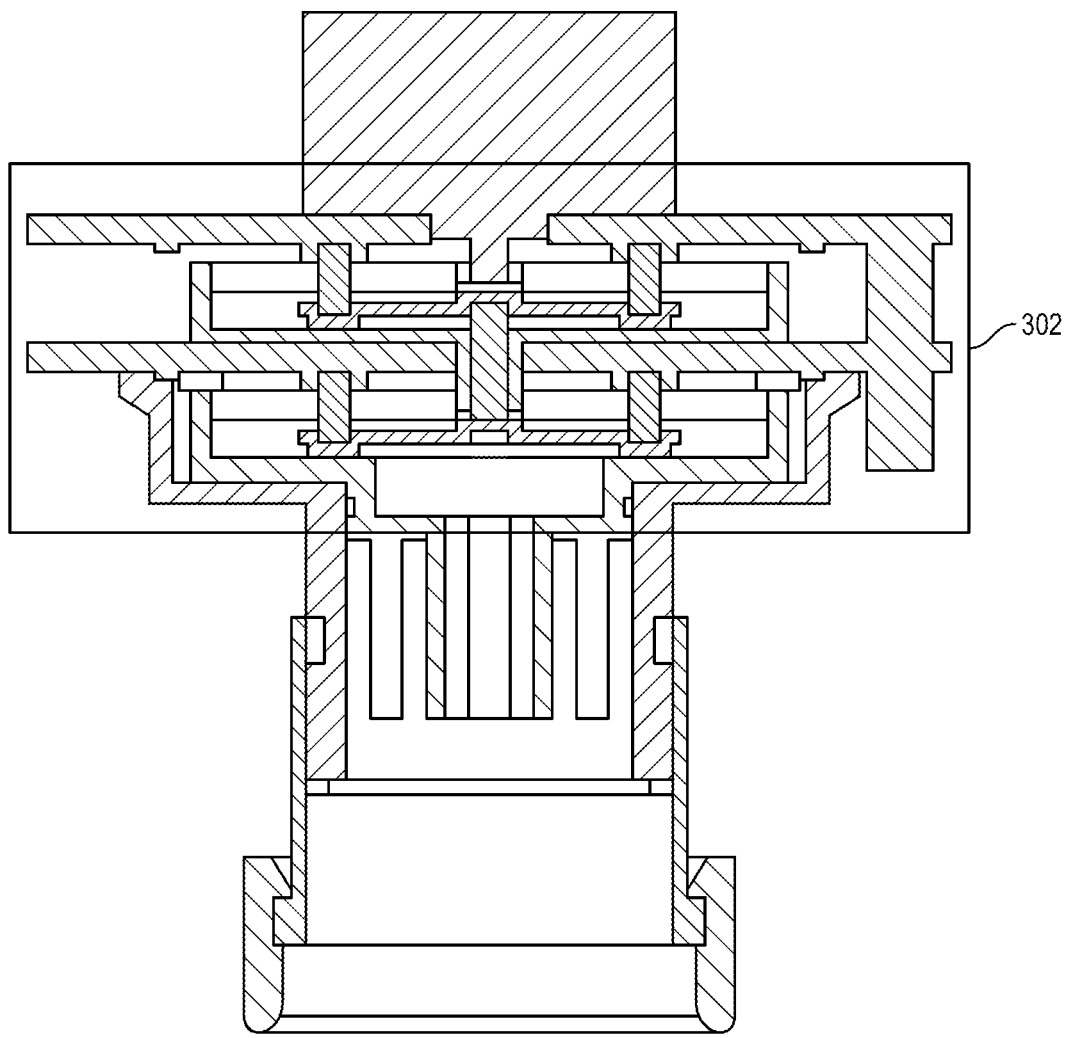
FIG. 6 is a side view, cut away schematic drawing of an epicyclic gear train unit with two stages, which can be implemented in the actuator of FIG. 3, according to some embodiments.

Referring now to FIG. 6, in an embodiment, the epicyclic gear train unit 302 with two stages is shown. The epicyclic gear train unit 302 with two stages may be implemented when the HVAC actuator 300 is a linear actuator. The two stage epicyclic gear train unit 302 includes two planetary stages having a single sun gear.

In an exemplary embodiment, the epicyclic gear train unit 302 with two stages may also be implemented for the HVAC actuator 300 which may be a rotary actuator. With the illustrated FIG. 5 and FIG. 6, the concept of multistage epicyclic gear train unit is introduced.

In some embodiments, rotation of epicyclic gear train unit 302 with one or more stages can be achieved by increasing the length of the ring gear and with serial arrangement of several individual planet stages to manufacture a planetary gear with a ratio of 25:1, for example. A three-stage gearbox can be obtained by increasing the length of the ring gear and adding another planet stage. In the above example, a multiple transmission ratio of 25:1 or a combined ratio of 25:1 which is arranged in series using single stage epicyclic gear unit may be obtained by using individual ratios. All individual ratios can be combined, which may result in a wider range of transmission ratio options for multi-stage epicyclic gear train units.

When the output motion from the epicyclic gear train unit 302 is received in the form of rotational motion, it can be converted into a linear motion. In an embodiment, the rotational motion received as the output motion from the epicyclic gear train unit 302 may be converted into the linear motion with the use of components such as leadscrew, screw, ball screw, roller screw, rack and pinion arrangement, and chain drive or belt drive that may be powered and controlled by electric components such as electric motors, magnetic coils.

In an embodiment, the epicyclic gear train unit 302 may be configured with a single stage or with a multi-staged arrangement. As described earlier, the control over speed and torque transmission increases with the increase in the stages of the epicyclic gear train unit 302.

In an embodiment, the epicyclic gear train unit 302 unit may be configured for transmission of the input motion to the output motion, both motions present in the form of rotational motion. Any suitable means capable of producing a rotational motion may be used to provide the input motion to the epicyclic gear train unit 302 which is enabled to convert the input motion (e.g., in the form of rotational motion) to the output motion (e.g., in the form of rotational motion) with a desired speed and torque.

While the epicyclic gear train unit 302 is enabled to receive the input motion as rotational motion and provide output motion as rotational motion, there may be instances when the input motion is rotational motion and the output motion is required in the form linear motion or when the input motion is linear motion and the output motion is required in the form of rotational motion. Such instances lead to the requirement of motion convertors which either convert rotational motion to linear motion or convert the linear motion to rotational motion.

The motion convertors may include one of, but are not limited to, a crankshaft arrangement, a rack and pinion arrangement, a chain and sprocket arrangement for conveyor belts, lead screw mechanism and the like. The motion converter can be an assembly or an arrangement of one or more components.

In some embodiments, the conversion of rotational motion to linear motion is disclosed. The input motion in the form of rotational motion may be received by the motor 301.

The output motion received in the form of rotational motion from the epicyclic gear train unit may be converted to linear motion by usage of the motion convertor. Thus a final output motion as linear motion is obtained by using the motion converter. In an example, a lead screw mechanism may be used to convert the rotational motion to the linear motion.

In yet another embodiment, the conversion of linear motion to rotational motion is disclosed. The input motion in the form of linear motion may be received from a rack. The linear motion from the rack may be converted to rotational motion by affixing a pinion over the rack which aids in the conversion of linear motion to rotational motion. The rack and pinion arrangement may be used as a motion converter for converting the linear motion to rotational motion. The rotational motion may be fed to the epicyclic gear train unit 302 which converts the received rotational motion to a final output motion in the form of rotational motion with required speed and torque.

In an exemplary embodiment, the epicyclic gear train unit 302 is enabled to receive the input motion and transmit the output motion only in the form of rotational motion. There can be conditions when the input motion will be provided in the form of linear motion or the output motion is required in the form of linear motion. Motion converters may be implemented to convert the linear motion to rotational motion or to convert the rotational motion to linear motion.

Figure 7:
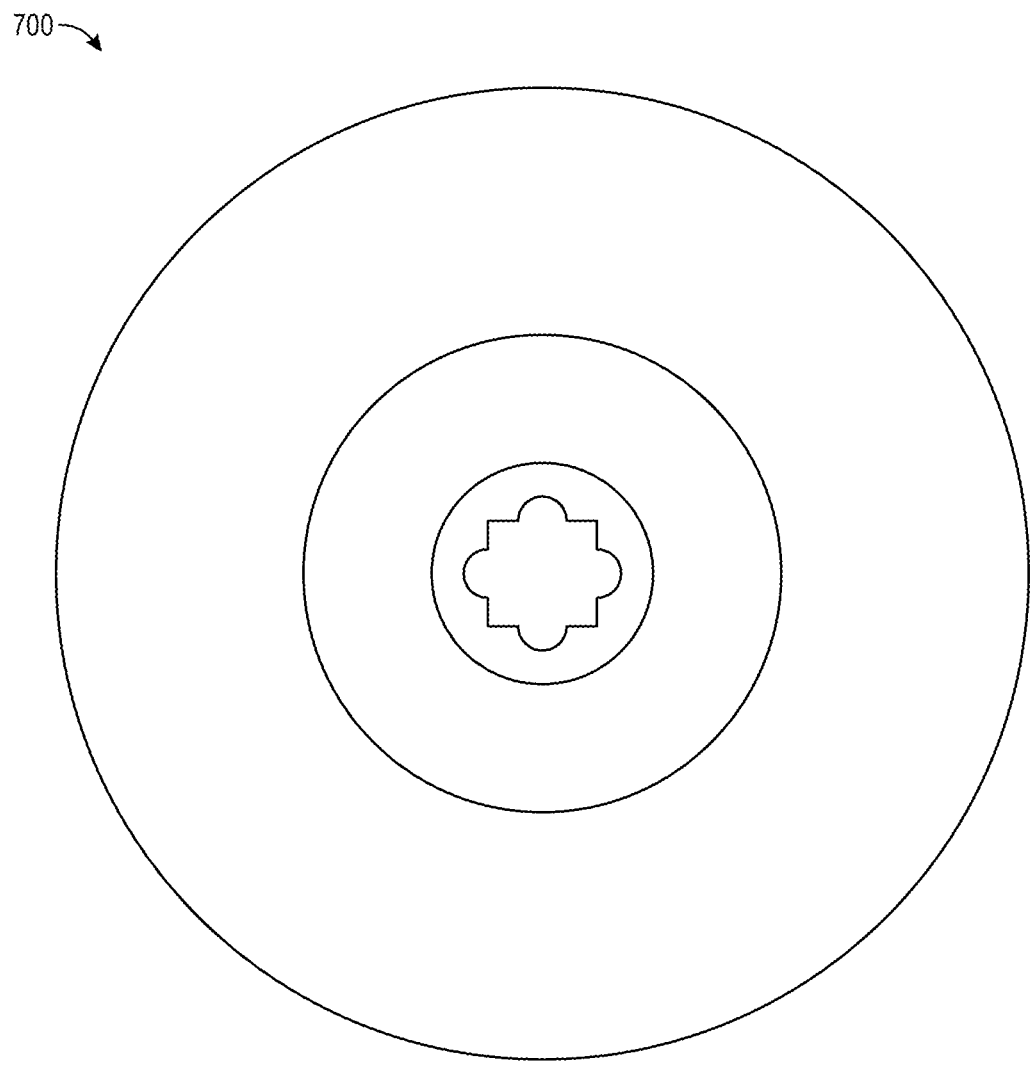
FIG. 7 is a top planar view schematic drawing of a threaded gear, which can be implemented in the actuator of FIG. 3, according to some embodiments.

Referring now to FIG. 7, a threaded gear 700 is shown. The threaded gear 700 may be used for rotary last stage by having a connection with the HVAC device 303 which may be a ball valve's stems, in one non-limiting embodiment.

In an embodiment, the HVAC actuator 300 can be used in an airside system, waterside system, building management system, or HVAC system. The HVAC actuator 300 includes a housing. The housing includes an enclosure having an interior surface with a channel. The channel includes a ledge portion. The channel extends through the enclosure. The HVAC actuator 300 includes a yoke having a notch located on an external surface of the yoke. The HVAC actuator 300 includes a locking mechanism including a ring having a tab. The tab is defined by a width of the channel and a width of the notch. Following assembly, the yoke is positioned in the enclosure such that the notch rests upon the ledge portion. Additionally, the locking mechanism is positioned on an opposite side of the enclosure with the tab positioned in the channel adjacent to the notch. As a result, the locking mechanism inhibits movement of the yoke relative to the enclosure.

In an embodiment, a method of manufacturing the HVAC actuator 300 is described. The method may include step of providing the epicyclic gear train unit 302 which may be further coupled with the motor 301. The motor 301 may be configured to provide the input motion to the epicyclic gear train unit 302. The method may further comprise the step of converting the input motion into a desired output motion wherein the desired output motion is configured to drive the HVAC device 303. In some embodiments, the epicyclic gear train unit 302 is a planetary gear system.

In some embodiments, epicyclic gear train unit 302 can be controlled via an input motion to sun gear 401, an input motion to annulus 406, or a combination thereof. The speed of the rotation of carrier 405 may vary based on the input motion provided to at least one of sun gear 401 or annulus 406. For example, an input motion provided to annulus 406 may rotate carrier 405 at a greater speed than an input motion provided to sun gear 401.

System with Epicyclic Gear Train Actuator

Figure 8:
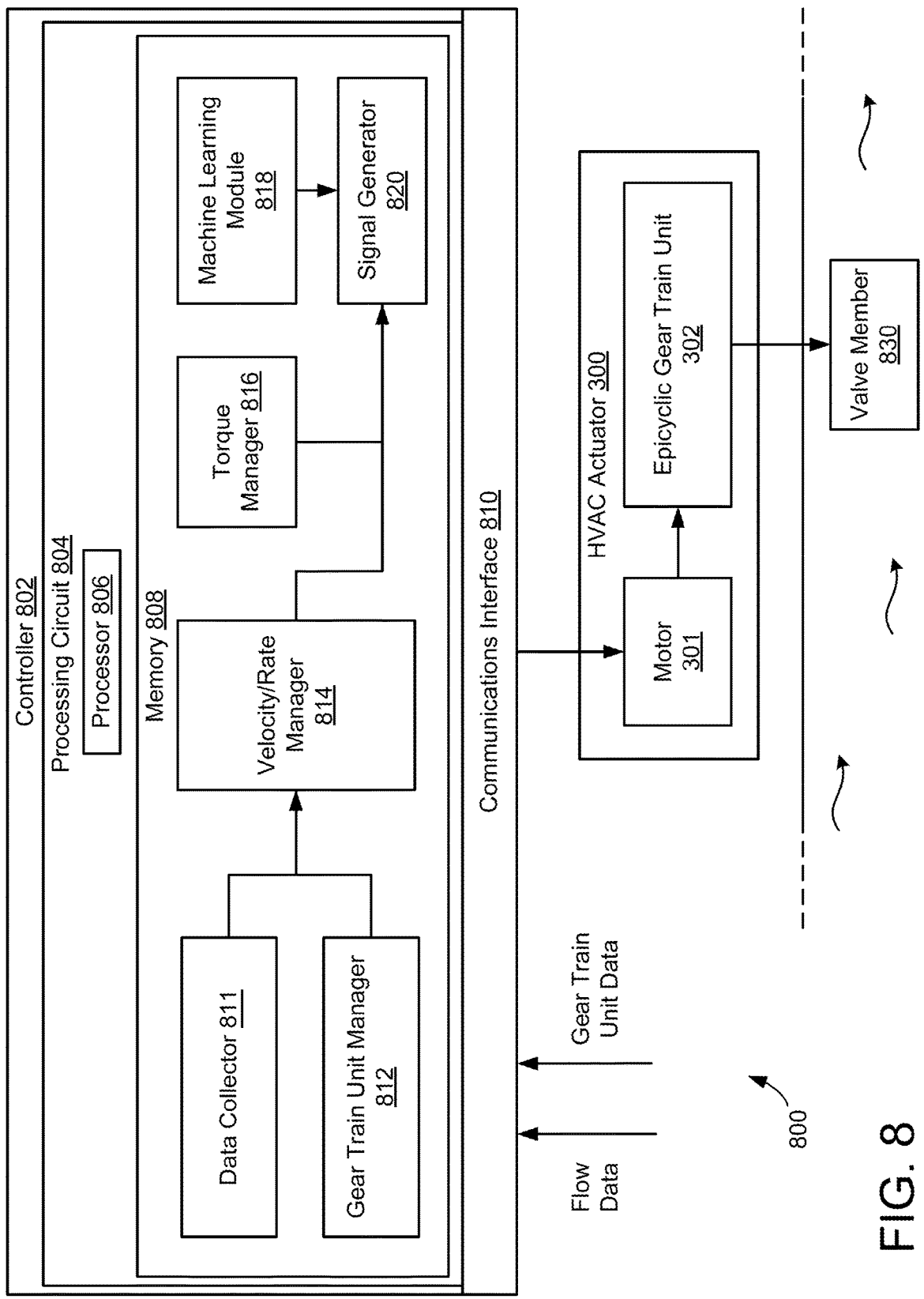
FIG. 8 is a block diagram of a control system which can be implemented in the HVAC system of FIG. 1, according to some embodiments.

Referring now to FIG. 8, a block diagram of system 800 for controlling a valve assembly is shown, according to some embodiments. System 800 is shown to include controller 802, and HVAC actuator 300. Controller 802 is shown to include processing circuit 804 including processor 806 and memory 808. Processing circuit 804 can be communicably connected to communications interface 720 such that processing circuit 804 and the various components thereof can send and receive data via communications interface 810. Processor 806 can be implemented as a general purpose processor, an application specific integrated circuit (ASIC), one or more field programmable gate arrays (FPGAs), a group of processing components, or other suitable electronic processing components.

Communications interface 810 can be or include wired or wireless communications interfaces (e.g., jacks, antennas, transmitters, receivers, transceivers, wire terminals, etc.) for conducting data communications. In various embodiments, communications via communications interface 810 can be direct (e.g., local wired or wireless communications) or via a communications network (e.g., a WAN, the Internet, a cellular network, etc.). For example, communications interface can include an Ethernet card and port for sending and receiving data via an Ethernet-based communications link or network. In another example, communications interface 810 can include a Wi-Fi transceiver for communicating via a wireless communications network. In another example, communications interface 810 can include cellular or mobile phone communications transceivers.

Memory 808 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present disclosure. Memory 808 can be or include volatile memory or non-volatile memory. Memory 808 can include database components, object code components, script components, or any other type of information structure for supporting the various activities and information structures described in the present disclosure. According to an example embodiment, memory 808 is communicably connected to processor 806 via processing circuit 804 and includes computer code for executing (e.g., by processing circuit 804 and/or processor 806) one or more processes described herein.

In some embodiments, controller 802 is implemented within a single computer (e.g., one server, one housing, etc.). In various other embodiments, controller 802 can be distributed across multiple servers or computers (e.g., that can exist in distributed locations). Further, while FIG. 8 shows controller 802 outside of actuator 300, in some embodiments, controller 802 and the various functionality performed thereby can be hosted actuator 300. Memory 808 is shown to include data collector 811, gear train unit manager 812, velocity/rate manager 814, torque manager 816, machine learning module 818, and signal generator 820.

In some embodiments, controller 802 is configured to receive real-time data of the operation of HVAC actuator 300 (e.g., valve stem position, etc.) and/or data relating to operation of valve member 830 (e.g., flow rate, valve position, etc.) and make adjustments to the input signal provided to motor 301 to improve control of system 800.

Data collector 811 may be configured to receive data relating to the operation of HVAC actuator 300 and/or a valve assembly coupled to HVAC actuator 300 (e.g., a valve assembly coupled to valve member 830, etc.). For example, one or more sensors may obtain measurements of the flow rate of fluid that is modulated by valve member 830, and the flow rate measurements are provided either wiredly or wirelessly to controller 802 for processing. Other types of sensor data that can be received by controller 802 include the rotational position, velocity, and/or acceleration of any of the gears within epicyclic gear train unit 302, torque measurements provided to epicyclic gear train unit 302 or output from epicyclic gear train unit 302, and voltage/current measurements provided to motor 301.

Gear train unit manager 812 may be configured to store information relating to the configuration and/or structure of epicyclic gear train unit and to provide this information to velocity/rate manager 814. For example, gear train unit manager 812 may include information relating to how many planetary gears are in each epicyclic gear train, how many epicyclic gear trains are in epicyclic gear train unit 302, the transmission ratios of each epicyclic gear train, etc.

In some embodiments, gear train unit manager 812, provides this information to velocity/rate manager 814.

Velocity/rate manager 814 may be configured to receive information from data collector 811 and gear train unit manager 812. In some embodiments, velocity/rate manager 814 works with torque manager 816 to determine if the control signals provided to motor 301 are providing an appropriate output motion to valve member 830. For example, the sensor data received by data collector 811 may be processed at velocity/rate manager 814 to determine a control signal adjustment, which can be provided to signal generator 820.

Machine learning module 818 may be configured to generate a model of operation of epicyclic gear train unit 302 using the real-time sensor data from data collector 811 and/or historical data as inputs to the model. In some embodiments, machine learning module 818 can implement a neural network to generate control signals that can provide control signals to motor 301 to adjust the final output motion of the final epicyclic gear train in epicyclic gear train unit 302, in the even that there are a plurality of epicyclic gear trains and the relationship between the input motition and the final output motition is nonlinear. Signal generator 820 may be configured to generate one or more control signals to send to motor 301 to adjust operation of HVAC actuator 300.

Configuration of Exemplary Embodiments

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above.

What is claimed is:

1. A heating, ventilation, or air conditioning (HVAC) actuator, the actuator comprising:
    a motor to provide an input motion according to a signal from a controller, wherein the controller generates the signal based on the obtained measurements from one or more sensors that obtain measurements of the input motion and an output motion; and
    an epicyclic gear train assembly comprising a sun gear, an annulus, and a plurality of planet gears, the epicyclic gear train assembly configured to:
    receive, at at least one of the sun gear or the annulus, the input motion at a first rotational velocity from the motor; and
    provide the output motion at a second rotational velocity to an HVAC component, the second rotational velocity different than the first rotational velocity.

2. The HVAC actuator of claim 1, wherein the epicyclic gear train assembly comprises a plurality of epicyclic gear trains in series, such that a first output motion of a first epicyclic gear train of the epicyclic gear train assembly is the input motion to a second epicyclic gear train in the epicyclic gear train assembly.

3. The HVAC actuator of claim 1, wherein the HVAC actuator is a linear actuator and the epicyclic gear train assembly is configured to:
    provide the output motion to a linear motion converter, the linear motion converter comprising at least one of a leadscrew, a screw, a ball screw, a roller screw, a rack and pinion arrangement, a chain drive or a belt drive,
    wherein the linear motion converter converts the received output motion to a linear motion and provides the linear motion to a valve stem of a valve assembly.

4. The HVAC actuator of claim 1, wherein the HVAC actuator is a rotary actuator and the epicyclic gear train assembly is configured to provide the output motion to a valve stem of a valve assembly.

5. The HVAC actuator of claim 1, wherein the epicyclic gear train assembly comprises a transmission ration ratio within a range of 11:1 to 25:1.

6. The HVAC actuator of claim 1, wherein:
    the input motion is received at the sun gear and the second rotational velocity is a first value; or
    the input motion is received at the annulus and the second rotational velocity is a second value,
    wherein the second value is substantially greater than the first value.

7. The HVAC actuator of claim 1, further comprising the controller coupled to the motor and comprising a processing circuit configured to:
    receive at least one of position, velocity, or acceleration data relating to operation of the epicyclic gear train assembly; and
    provide a control signal to the motor, the control signal instructing the motor to adjust the input motion based on the at least one of the position, velocity, or acceleration data,
    wherein the controller, the motor, and the epicyclic gear train assembly are disposed within a single housing.

8. A heating, ventilation, or air conditioning (HVAC) system for controlling an HVAC actuator, the system comprising:
    a motor; and
    an epicyclic gear train assembly comprising a sun gear, an annulus, and a plurality of planet gears, the epicyclic gear train assembly configured to:
    receive, at at least one of the sun gear or the annulus, an input motion at a first rotational velocity from the motor; and
    provide an output motion at a second rotational velocity to an HVAC component, the second rotational velocity different than the first rotational velocity;
    one or more sensors configured to obtain measurements of the input motion and the output motion; and
    a controller comprising a processing circuit configured to adjust the input motion based on the obtained measurements from the one or more sensors.

9. The HVAC system of claim 8, wherein the epicyclic gear train assembly comprises a plurality of epicyclic gear trains in series, such that a first output motion of a first epicyclic gear train of the epicyclic gear train assembly is the input motion to a second epicyclic gear train in the epicyclic gear train assembly.

10. The HVAC system of claim 8, wherein the HVAC actuator is a linear actuator and the epicyclic gear train assembly is configured to:
    provide the output motion to a linear motion converter, the linear motion converter comprising at least one of a leadscrew, a screw, a ball screw, a roller screw, a rack and pinion arrangement, a chain drive or a belt drive,
    wherein the linear motion converter converts the received output motion to a linear motion and provides the linear motion to a valve stem of a valve assembly.

11. The HVAC system of claim 8, wherein the HVAC actuator is a rotary actuator and the epicyclic gear train assembly is configured to provide the output motion to a valve stem of a valve assembly.

12. The HVAC system of claim 8, wherein the epicyclic gear train assembly comprises a transmission ratio within a range of 11:1 to 25:1.

13. The HVAC system of claim 8, wherein:
    the input motion is received at the sun gear and the second rotational velocity is a first value; or
    the input motion is received at the annulus and the second rotational velocity is a second value,
    wherein the second value is substantially greater than the first value.

14. The HVAC system of claim 8, wherein the processing circuit is further configured to:
- receive at least one of position, velocity, or acceleration data relating to operation of the epicyclic gear train assembly; and
- provide a control signal to the motor, the control signal instructing the motor to adjust the input motion based on the at least one of the position, velocity, or acceleration data,
- wherein the controller, the motor, and the epicyclic gear train assembly are disposed within a single housing.

15. A flow control system, the flow control system comprising:
- a motor to provide an input motion according to a signal from a controller, wherein the controller generates the signal based on the obtained measurements from one or more sensors that obtain measurements of the input motion and an output motion; and
- an epicyclic gear train assembly comprising a sun gear, an annulus, and a plurality of planet gears, the epicyclic gear train assembly configured to:
- receive, at at least one of the sun gear or the annulus, an input motion at a first rotational velocity from the motor; and
- provide an output motion at a second rotational velocity to a valve stem of a valve assembly, the second rotational velocity different than the first rotational velocity; and
- the valve assembly disposed within a fluid stream and configured to modulate fluid flow in the fluid stream based on the output motion.

16. The flow control system of claim 15, wherein the epicyclic gear train assembly comprises a plurality of epicyclic gear trains in series, such that a first output motion of a first epicyclic gear train of the epicyclic gear train assembly is the input motion to a second epicyclic gear train in the epicyclic gear train assembly.

17. The flow control system of claim 15, wherein the HVAC actuator is a linear actuator and the epicyclic gear train assembly is configured to:
- provide the output motion to a linear motion converter, the linear motion converter comprising at least one of a leadscrew, a screw, a ball screw, a roller screw, a rack and pinion arrangement, a chain drive or a belt drive,
- wherein the linear motion converter converts the received output motion to a linear motion and provides the linear motion to the valve stem of the valve assembly.

18. The flow control system of claim 15, wherein the epicyclic gear train assembly comprises a transmission ratio within a range of 11:1 to 25:1.

19. The flow control system of claim 15, wherein:
- the input motion is received at the sun gear and the second rotational velocity is a first value; or
- the input motion is received at the annulus and the second rotational velocity is a second value,
- wherein the second value is substantially greater than the first value.

20. The flow control system of claim 15, further comprising the controller coupled to the motor and comprising a processing circuit configured to:
- receive at least one of position, velocity, or acceleration data relating to operation of the epicyclic gear train assembly; and
- provide a control signal to the motor, the control signal instructing the motor to adjust the input motion based on the at least one of the position, velocity, or acceleration data,
- wherein the controller, the motor, and the epicyclic gear train assembly are disposed within a single housing.

* * * * *